United States Patent
Burceanu et al.

(10) Patent No.: US 11,194,799 B2
(45) Date of Patent: *Dec. 7, 2021

(54) SYSTEMS AND METHODS FOR TRANSLATING NATURAL LANGUAGE SENTENCES INTO DATABASE QUERIES

(71) Applicant: Bitdefender IPR Management Ltd., Nicosia (CY)

(72) Inventors: Elena Burceanu, Buchare (RO); Florin Brad, Campina (RO); Traian Rebedea, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 82 days.

This patent is subject to a terminal disclaimer.

(21) Appl. No.: 16/882,615

(22) Filed: May 25, 2020

(65) Prior Publication Data
US 2020/0285638 A1    Sep. 10, 2020

Related U.S. Application Data

(63) Continuation of application No. 16/020,910, filed on Jun. 27, 2018, now Pat. No. 10,664,472.

(51) Int. Cl.
| | |
|---|---|
| *G06F 16/2452* | (2019.01) |
| *G06F 16/242* | (2019.01) |
| *G06F 40/253* | (2020.01) |
| *G06F 40/211* | (2020.01) |
| *G06F 40/146* | (2020.01) |
| *G06F 40/51* | (2020.01) |

(52) U.S. Cl.
CPC ...... *G06F 16/24522* (2019.01); *G06F 16/243* (2019.01); *G06F 40/146* (2020.01); *G06F 40/211* (2020.01); *G06F 40/253* (2020.01); *G06F 40/51* (2020.01)

(58) Field of Classification Search
CPC ............. G06F 16/24522; G06F 16/243; G06F 40/253; G06F 40/211; G06F 40/146; G06F 40/51; G06F 40/42; G06F 40/143; G06N 3/08
USPC .......................................................... 704/9
See application file for complete search history.

(56) References Cited

U.S. PATENT DOCUMENTS

| | | | | |
|---|---|---|---|---|
| 6,317,707 B1* | 11/2001 | Bangalore | ............. | G06F 40/284 704/9 |
| 7,177,798 B2* | 2/2007 | Hsu | ......... | G10L 15/18 704/10 |

(Continued)

*Primary Examiner* — Thuykhanh Le
(74) *Attorney, Agent, or Firm* — Law Office of Andrei D Popovici, PC

(57) ABSTRACT

Described systems and methods allow an automatic translation from a natural language (e.g., English) into an artificial language such as a structured query language (SQL). In some embodiments, a translator module includes an encoder component and a decoder component, both components comprising recurrent neural networks. Training the translator module comprises two stages. A first stage trains the translator module to produce artificial language (AL) output when presented with an AL input. For instance, the translator is first trained to reproduce an AL input. A second stage of training comprises training the translator to produce AL output when presented with a natural language (NL) input.

18 Claims, 10 Drawing Sheets

(56) References Cited

U.S. PATENT DOCUMENTS

| | | | |
|---|---|---|---|
| 8,140,556 B2* | 3/2012 | Rao | G06F 16/242 707/759 |
| 8,549,397 B2* | 10/2013 | Soldan | G06F 40/146 715/236 |
| 8,666,928 B2* | 3/2014 | Tunstall-Pedoe | G06N 5/00 706/55 |
| 8,789,009 B2* | 7/2014 | Lee | G06F 8/35 717/104 |
| 2003/0216905 A1* | 11/2003 | Chelba | G06F 40/00 704/9 |
| 2007/0055502 A1* | 3/2007 | Preuss | G10L 19/12 704/219 |
| 2007/0238085 A1* | 10/2007 | Colvin | G09B 19/00 434/365 |
| 2008/0263486 A1* | 10/2008 | Alexanian | G06F 30/3323 716/106 |
| 2008/0300863 A1* | 12/2008 | Smith | G06F 40/58 704/9 |
| 2008/0300864 A1* | 12/2008 | Smith | G06F 40/154 704/9 |
| 2009/0006345 A1* | 1/2009 | Platt | G06F 40/274 |
| 2009/0112835 A1* | 4/2009 | Elder | F16K 15/16 |
| 2009/0187425 A1* | 7/2009 | Thompson | G10L 15/26 705/3 |
| 2009/0299729 A1* | 12/2009 | Quirk | G06F 40/45 704/9 |
| 2012/0101803 A1* | 4/2012 | Popov | G06F 40/30 704/2 |
| 2012/0136649 A1* | 5/2012 | Freising | G06F 40/30 704/9 |
| 2012/0173515 A1* | 7/2012 | Jeong | G06F 16/258 707/718 |
| 2013/0019163 A1* | 1/2013 | Thompson | G06F 16/80 715/234 |
| 2013/0158982 A1* | 6/2013 | Zechner | G10L 15/1815 704/9 |
| 2013/0226846 A1* | 8/2013 | Li | G06F 40/295 706/12 |
| 2013/0310078 A1* | 11/2013 | Raman | H04W 4/021 455/456.3 |
| 2014/0046891 A1* | 2/2014 | Banas | G06N 5/022 706/46 |
| 2014/0136564 A1* | 5/2014 | Lee | G06F 16/33 707/769 |
| 2014/0249804 A1* | 9/2014 | Jackson | G06F 40/211 704/9 |
| 2014/0304086 A1* | 10/2014 | Dasdan | G06Q 30/0242 705/14.71 |
| 2014/0330809 A1* | 11/2014 | Raina | G06F 16/24565 707/722 |
| 2014/0365210 A1* | 12/2014 | Riskin | G06F 40/103 704/9 |
| 2015/0261744 A1* | 9/2015 | Suenbuel | G06F 40/211 704/9 |
| 2015/0356073 A1* | 12/2015 | Vion-Drury | G06F 40/30 704/9 |
| 2016/0026730 A1* | 1/2016 | Hasan | G06F 40/143 715/234 |
| 2016/0062753 A1* | 3/2016 | Champagne | G06F 8/51 717/137 |
| 2016/0132608 A1* | 5/2016 | Rathod | H04W 4/21 707/722 |
| 2016/0162456 A1* | 6/2016 | Munro | G06F 40/137 704/9 |
| 2016/0171050 A1* | 6/2016 | Das | G06F 16/90332 707/714 |
| 2016/0196335 A1* | 7/2016 | Vee | G06Q 30/0241 707/722 |
| 2017/0075953 A1* | 3/2017 | Bozkaya | G06F 16/24522 |
| 2017/0115969 A1* | 4/2017 | Pendharkar | G06F 11/3664 |
| 2017/0262514 A1* | 9/2017 | Campbell | G06F 16/24522 |
| 2018/0011903 A1* | 1/2018 | Abolhassani | G06F 16/243 |
| 2018/0013579 A1* | 1/2018 | Fairweather | H04L 67/125 |
| 2018/0165273 A1* | 6/2018 | Nir | G06F 40/284 |
| 2019/0129695 A1* | 5/2019 | Malur Srinivasan | G06F 40/253 |
| 2019/0384851 A1* | 12/2019 | Le | G06F 16/2423 |
| 2020/0159755 A1* | 5/2020 | Iida | G06F 40/268 |

* cited by examiner

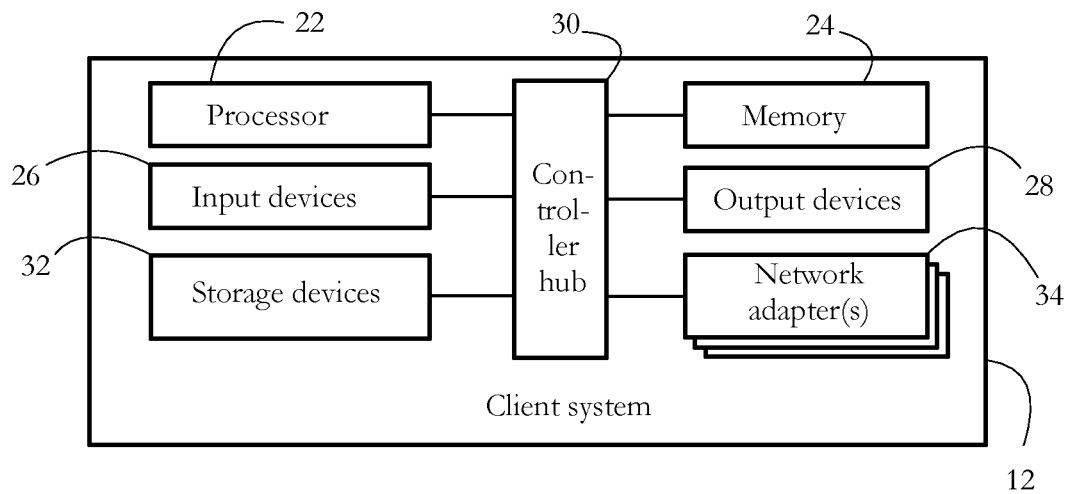
FIG. 2-A
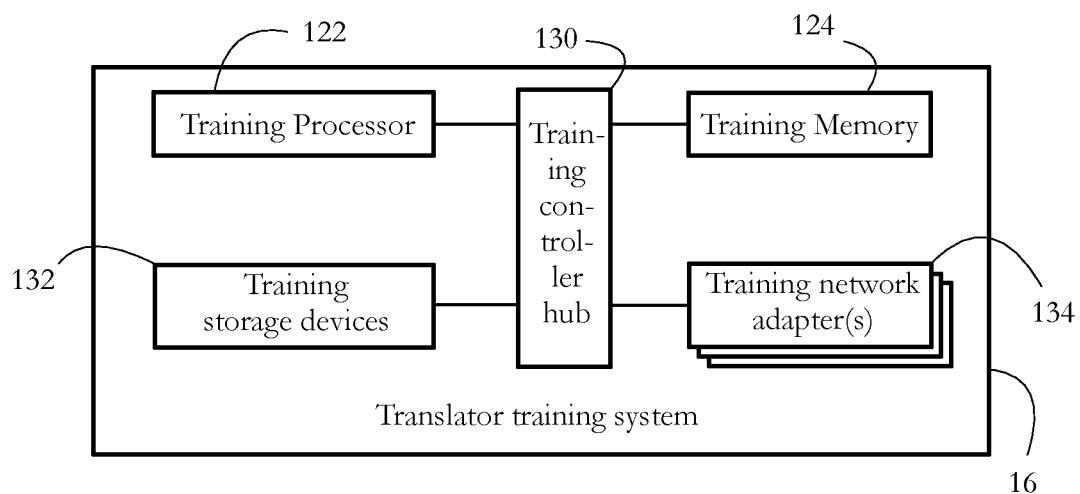
FIG. 2-B

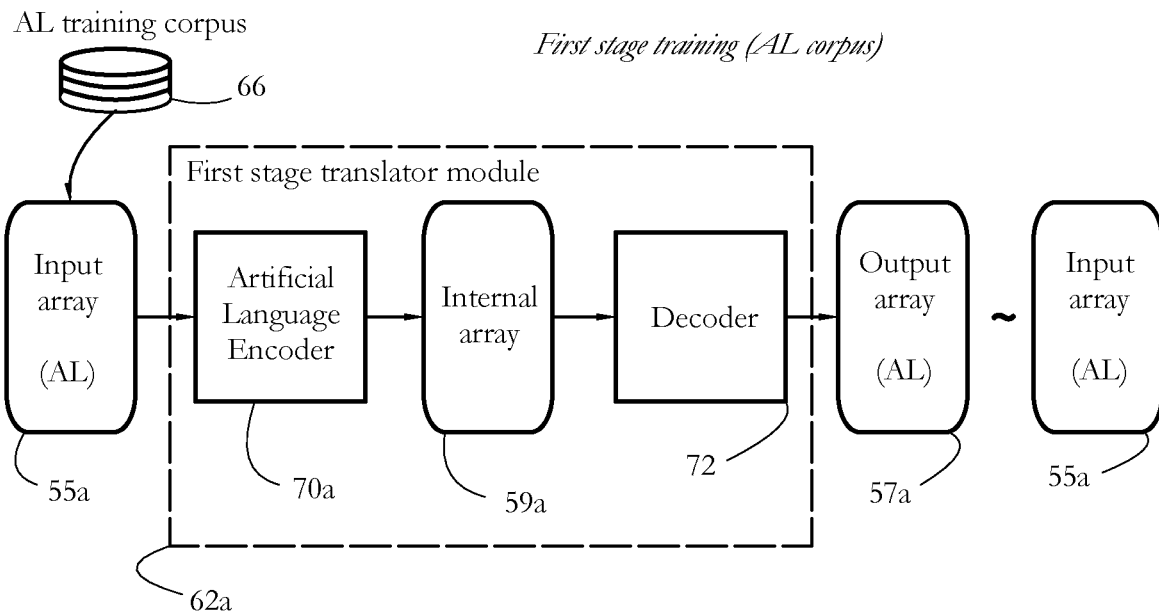
FIG. 10
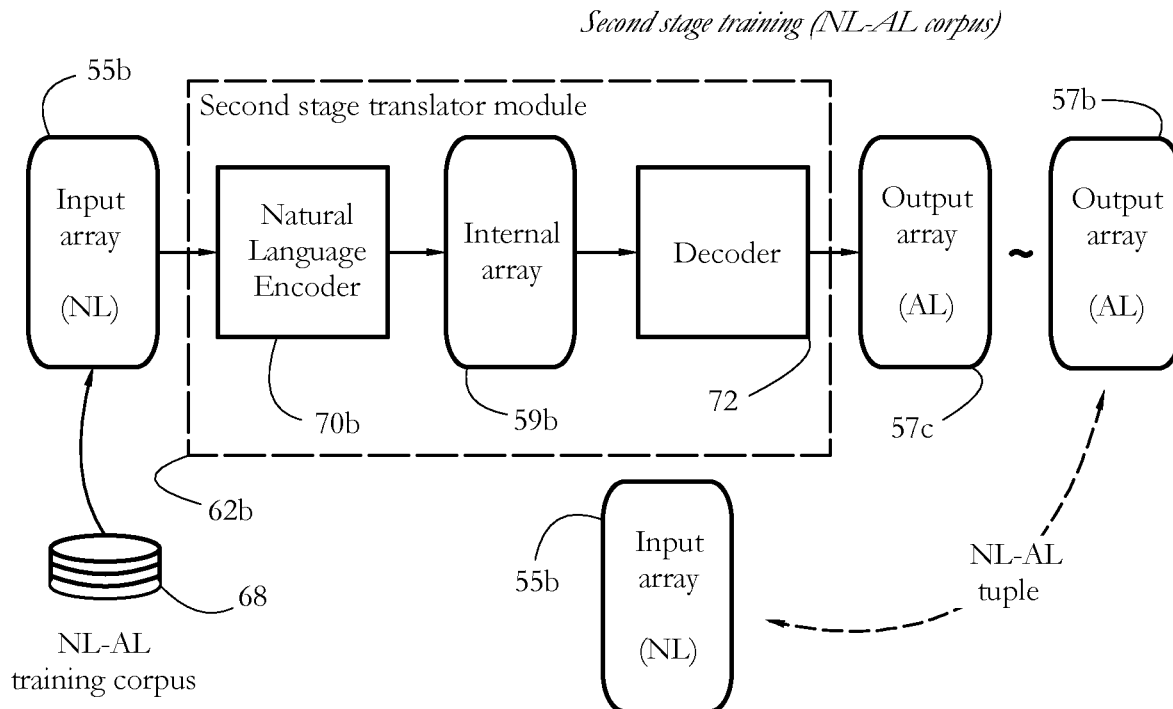
FIG. 11-A

FIG. 11-B

SYSTEMS AND METHODS FOR TRANSLATING NATURAL LANGUAGE SENTENCES INTO DATABASE QUERIES

RELATED APPLICATIONS

This application is a continuation of U.S. patent application Ser. No. 16/020,910, filed on Jun. 27, 2018, entitled "Systems and Methods For Translating Natural Language Sentences Into Database Queries," which is scheduled to issue on May 26, 2020 as U.S. Pat. No. 10,664,472 and which is herein incorporated by reference.

BACKGROUND

The invention relates to systems and methods for automatic translation from a natural language to an artificial machine-readable language.

In recent years, an increasing number of products and services rely on gathering and analyzing large amounts of data. Examples span virtually all areas of human activity, from production to commerce, scientific research, healthcare, and defense. They include, for instance, a retail system managing stocks, clients, and sales across multiple stores and warehouses, logistics software for managing a large and diverse fleet of carriers, and an Internet advertising service relying on user profiling to target offers at potential customers. Managing large volumes of data has fostered innovation and developments in database architecture, as well as in systems and methods of interacting with the respective data. As the size and complexity of databases increase, using human operators to search, retrieve and analyze the data in fast becoming impractical.

In parallel, we are witnessing an explosive growth and diversification of electronic appliances commonly known as "the Internet of things". Devices from mobile telephones to home appliances, wearables, entertainment devices, and various sensors and gadgets incorporated into cars, houses, etc., typically connect to remote computers and/or various databases to perform their function. A highly desirable feature of such devices and services is user friendliness. The commercial pressure to make such products and services accessible to a broad audience is driving research and development of innovative man-machine interfaces. Some examples of such technologies include personal assistants such as Apple's Siri® and Echo® from Amazon®, among others.

There is therefore considerable interest in developing systems and methods that facilitate the interaction between humans and computers, especially in applications that include database access and/or management.

SUMMARY

According to one aspect, a method comprises employing at least one hardware processor of the computer system to train an automatic translator to translate from a natural language (NL) to an artificial language (AL). Training the automatic translator comprises performing a first stage of training; in response to performing the first stage of training, determining whether a first stage training termination condition is satisfied; and in response, when the first stage training termination condition is satisfied, performing a second stage of training. Performing the first stage of training comprises coupling an AL encoder neural network (NN) to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input. Performing the first stage of training further comprises training the decoder NN to improve a similarity between the AL input and the AL output. Performing the second stage of training comprises coupling a trained decoder NN generated by the first stage of training to a NL encoder NN, the NL encoder NN configured to receive an NL input formulated in the natural language and to transmit a result of processing the NL input to the trained decoder NN. Performing the second stage of training further comprises employing the trained decoder NN to determine another AL output according to the result of processing the NL input, and training the NL encoder NN to improve a similarity between the other AL output and a target AL output comprising a translation of the NL input into the artificial language.

According to another aspect, a computer system comprises at least one hardware processor configured to train an automatic translator to translate from a NL to an AL. Training the automatic translator comprises performing a first stage of training; in response to performing the first stage of training, determining whether a first stage training termination condition is satisfied; and in response, when the first stage training termination condition is satisfied, performing a second stage of training. Performing the first stage of training comprises coupling an AL encoder NN to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input. Performing the first stage of training further comprises training the decoder NN to improve a similarity between the AL input and the AL output. Performing the second stage of training comprises coupling a trained decoder NN generated by the first stage of training to a NL encoder NN, the NL encoder NN configured to receive an NL input formulated in the natural language and to transmit a result of processing the NL input to the trained decoder NN. Performing the second stage of training further comprises employing the trained decoder NN to determine another AL output according to the result of processing the NL input, and training the NL encoder NN to improve a similarity between the other AL output and a target AL output comprising a translation of the NL input into the artificial language.

According to another aspect, a non-transitory computer-readable medium stores instructions which, when executed by a first hardware processor of a first computer system, cause the first computer system to form a trained automatic translator configured to translate from a NL to an AL, the automatic translator comprising a NL encoder NN and a decoder NN connected to the NL encoder NN. Training the automatic translator comprises employing a second hardware processor of a second computer system to perform a first stage of training; in response to performing the first stage of training, determine whether a first stage training termination condition is satisfied; and in response, when the first stage training termination condition is satisfied, perform a second stage of training. Performing the first stage of training comprises coupling an AL encoder NN to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input. Performing the first stage of training further comprises training the decoder NN to improve a similarity between the AL input and the AL output. Performing the second stage of training comprises coupling a trained decoder NN generated by the first stage of training to a NL encoder NN, the NL encoder NN configured to receive an NL input formulated in the natural language and to transmit a result of processing the NL input to the trained decoder NN. Performing the second stage of training further comprises employing the trained decoder NN to determine another AL output according to the result of processing the NL input, and training the NL encoder NN to improve a similarity between the other AL output and a target AL output comprising a translation of the NL input into the artificial language.

According to another aspect, a computer system comprises a first hardware processor configured to execute a trained automatic translator configured to translate from a NL to an AL, the automatic translator comprising a NL encoder NN and a decoder NN connected to the NL encoder NN. Training the automatic translator comprises employing a second hardware processor of a second computer system to perform a first stage of training; in response to performing the first stage of training, determine whether a first stage training termination condition is satisfied; and in response, when the first stage training termination condition is satisfied, perform a second stage of training. Performing the first stage of training comprises coupling an AL encoder NN to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input. Performing the first stage of training further comprises training the decoder NN to improve a similarity between the AL input and the AL output. Performing the second stage of training comprises coupling a trained decoder NN generated by the first stage of training to a NL encoder NN, the NL encoder NN configured to receive an NL input formulated in the natural language and to transmit a result of processing the NL input to the trained decoder NN. Performing the second stage of training further comprises employing the trained decoder NN to determine another AL output according to the result of processing the NL input, and training the NL encoder NN to improve a similarity between the other AL output and a target AL output comprising a translation of the NL input into the artificial language.

BRIEF DESCRIPTION OF THE DRAWINGS

The foregoing aspects and advantages of the present invention will become better understood upon reading the following detailed description and upon reference to the drawings where:

FIG. 2-A shows an exemplary hardware configuration of a client system according to some embodiments of the present invention.

FIG. 2-B shows an exemplary hardware configuration of a translator training system according to some embodiments of the present invention.

FIG. 10 illustrates an exemplary first stage of training the translator module according to some embodiments of the present invention.

FIG. 11-B illustrates an alternative exemplary second stage of training the translator module to according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized collection of data. Unless otherwise specified, a sentence is a sequence of words and/or tokens formulated in a natural or artificial language. Two sentences formulated in distinct languages are herein deemed translations of each other when the two sentences are semantic equivalents of each other, i.e., the two sentences have the same or very similar meaning.

Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
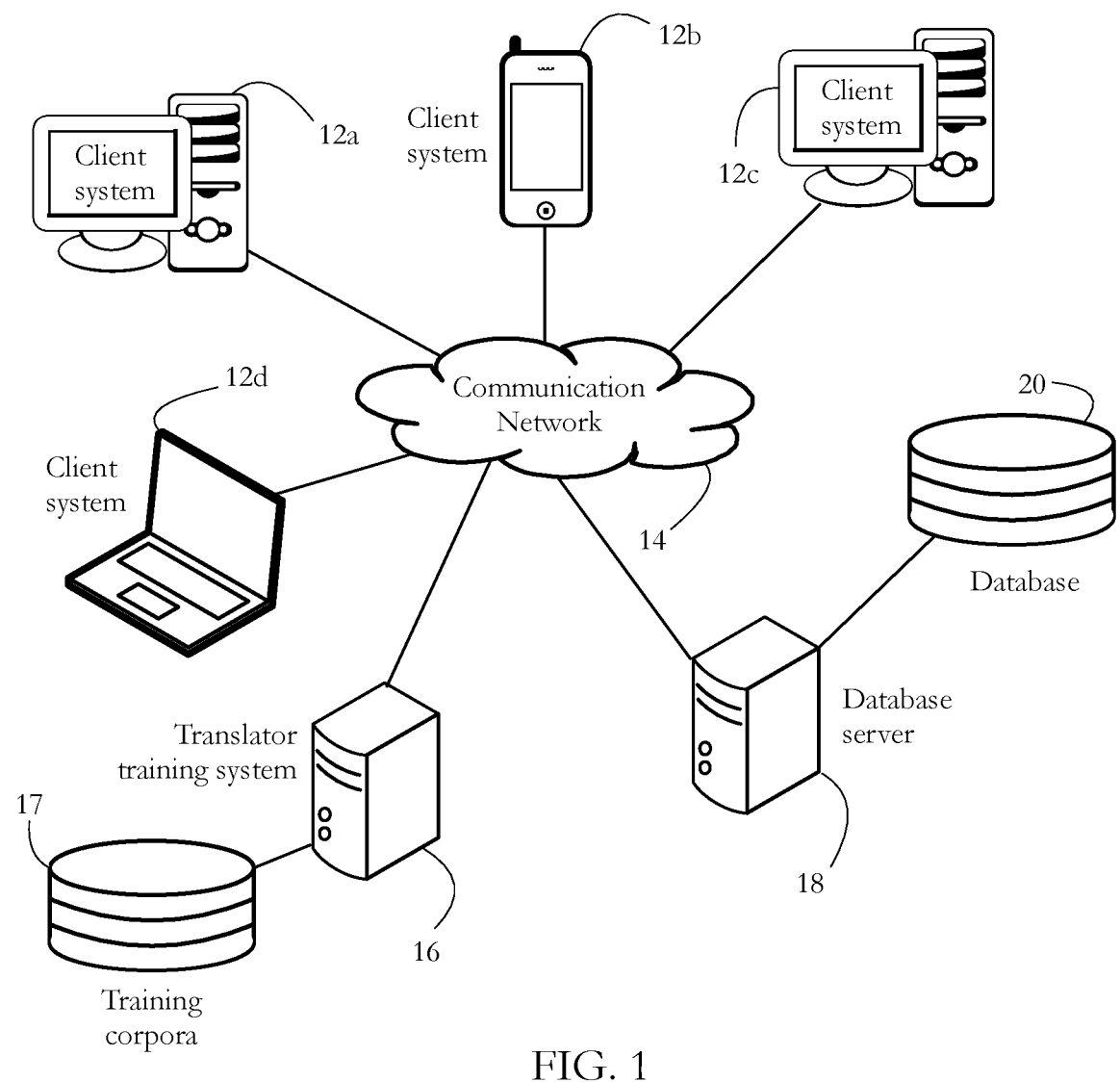
FIG. 1 shows an exemplary automated database access system, wherein a set of clients collaborate with a translator training system and database server according to some embodiments of the present invention.

FIG. 1 shows an exemplary database access and management system according to some embodiments of the present invention. A plurality of client systems 12a-d may interact with a database server 18, for instance to execute a query thereby accessing/retrieving/writing a set of data from/to a database 20. Exemplary databases 20 include a relational database, an extensible markup language (XML) database, a spreadsheet, and a key-value store, among others.

Exemplary client systems 12a-d include personal computer systems, mobile computing platforms (laptop computers, tablets, mobile telephones), entertainment devices (TVs, game consoles), wearable devices (smartwatches, fitness bands), household appliances, and any other electronic device comprising a processor, a memory, and a communication interface. Client systems 12a-d are connected to server 18 over a communication network 14, e.g., the Internet. Parts of network 14 may include a local area network (LAN) such as a home or corporate network. Database server 18 generically describes a set of computing systems communicatively coupled to database 20 and configured to access database 20 to carry out data insertion, data retrieval, and/or other database management operations.

In one exemplary application of the illustrated system, client systems 12a-d represent individual computers used by employees of an e-commerce company, and database 20 represents a relational database storing records of products the respective company is selling. Employees may use the illustrated system, for instance, to find out how many items of a particular product are currently in stock in a particular warehouse.

In some embodiments, access to database 20 is facilitated by software executing on client systems 12a-d and/or database server 18, the respective software comprising a translator component enabling an automatic translation of a sentence formulated in a natural language (e.g., English, Chinese) into a set of sentences formulated in an artificial, formal language such as structured query language (SQL), a programming language (e.g., C++, Java®, bytecode), and/or a markup language (e.g., XML, hypertext markup language—HTML). In some embodiments, the respective translator comprises an artificial intelligence system such as a set of neural networks trained by a translator training system 16 also connected to network 14. The operation of translator training system 16, as well as of the translator itself, will be described in more detail below.

FIG. 2-A shows an exemplary hardware configuration of a client system 12. Client system 12 may represent any of client systems 12a-d of FIG. 1. Without loss of generality, the illustrated client system is a computer system. The hardware configuration of other client systems (e.g., mobile telephones, smartwatches) may differ somewhat from the one illustrated in FIG. 2-A. Client system 12 comprises a set of physical devices, including a hardware processor 22 and a memory unit 24. Processor 22 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 22 in the form of a sequence of processor instructions (e.g. machine code or other type of encoding). Memory unit 24 may comprise volatile computer-readable media (e.g. DRAM, SRAM) storing instructions and/or data accessed or generated by processor 22.

Input devices 26 may include computer keyboards, mice, and microphones, among others, including the respective hardware interfaces and/or adapters allowing a user to introduce data and/or instructions into client system 12. Output devices 28 may include display devices such as monitors and speakers among others, as well as hardware interfaces/adapters such as graphic cards, allowing client system 12 to communicate data to a user. In some embodiments, input devices 26 and output devices 28 may share a common piece of hardware, as in the case of touch-screen devices. Storage devices 32 include computer-readable media enabling the non-volatile storage, reading, and writing of software instructions and/or data. Exemplary storage devices 32 include magnetic and optical disks and flash memory devices, as well as removable media such as CD and/or DVD disks and drives. The set of network adapters 34 enables client system 12 to connect to a computer network and/or to other devices/computer systems. Controller hub 30 represents the plurality of system, peripheral, and/or chipset buses, and/or all other circuitry enabling the communication between processor 22 and devices 24, 26, 28, 32, and 34. For instance, controller hub 30 may include a memory controller, an input/output (I/O) controller, and an interrupt controller, among others. In another example, controller hub 30 may comprise a northbridge connecting processor 22 to memory 24 and/or a southbridge connecting processor 22 to devices 26, 28, 32, and 34.

FIG. 2-B shows an exemplary hardware configuration of translator training system 16 according to some embodiments of the present invention. The illustrated training system includes a computer comprising at least a training processor 122 (e.g., microprocessor, multi-core integrated circuit), a physical memory 124, a set of training storage devices 132, and a set of training network adapters 134. Storage devices 132 include computer-readable media enabling the non-volatile storage, reading, and writing of software instructions and/or data. Adapters 134 may include network cards and other communication interfaces enabling training system 16 to connect to communication network 14. In some embodiments, translator training system 16 further comprises input and output devices, which may be similar in function to input and output devices 26 and 28 of client system 12, respectively.

Figure 3:
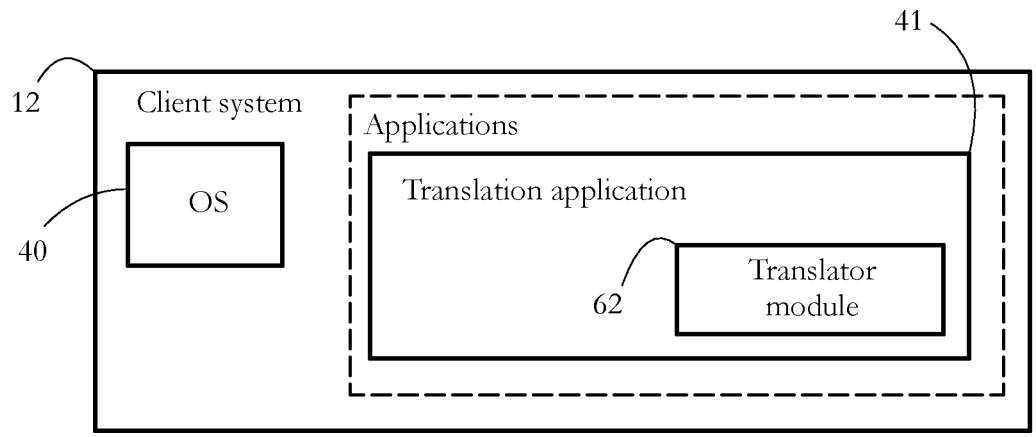
FIG. 3 shows a set of exemplary software components executing on a client system according to some embodiments of the present invention.

FIG. 3 shows exemplary computer programs executing on client system 12 according to some embodiments of the present invention. Such software may include an operating system (OS) 40, which may comprise any widely available operating system such as Microsoft Windows®, MacOS®, Linux®, iOS®, or Android™, among others. OS 40 provides an interface between the hardware of client system 12 and a set of applications including, for instance, a translation application 41. In some embodiments, application 41 is configured to automatically translate natural language (NL) sentences into artificial language (AL) sentences, for instance into a set of SQL queries and/or into a sequence of software instructions (code). Translation application 41 includes a translator module 62 performing the actual translation, and may further include, among others, components which receive the respective natural language sentences from the user (e.g., as text or speech via input devices 26), components that parse and analyze the respective NL input (e.g., speech parser, tokenizer, various dictionaries, etc.), components that transmit the translated AL output to database server 18, and components that display a content of a response from server 18 to the user. Translator module 62 comprises an instance of an artificial intelligence system (e.g., a set of neural networks) trained by translator training system 16 to perform NL-to-AL translations as further described below. Such training may result in a set of optimal parameter values of translator 62, values that may be transferred from training system 16 to client 12 and/or database server 18 for instance via periodic or on-demand software updates. The term 'trained translator' herein refers to a translator module instantiated with such optimal parameter values received from translator training system 16.

For clarity, the following description will focus on an exemplary application wherein translator module 62 outputs a database query, i.e., a set of sentences formulated in a query language such as SQL. The illustrated systems and methods are therefore directed to enabling a human operator to carry out database queries. However, a skilled artisan will understand that the described systems and methods may be modified and adapted to other applications wherein the translator is configured to produce computer code (e.g., Java®, bytecode, etc.), data markup (e.g. XML), or output formulated in any other artificial language.

Figure 4:
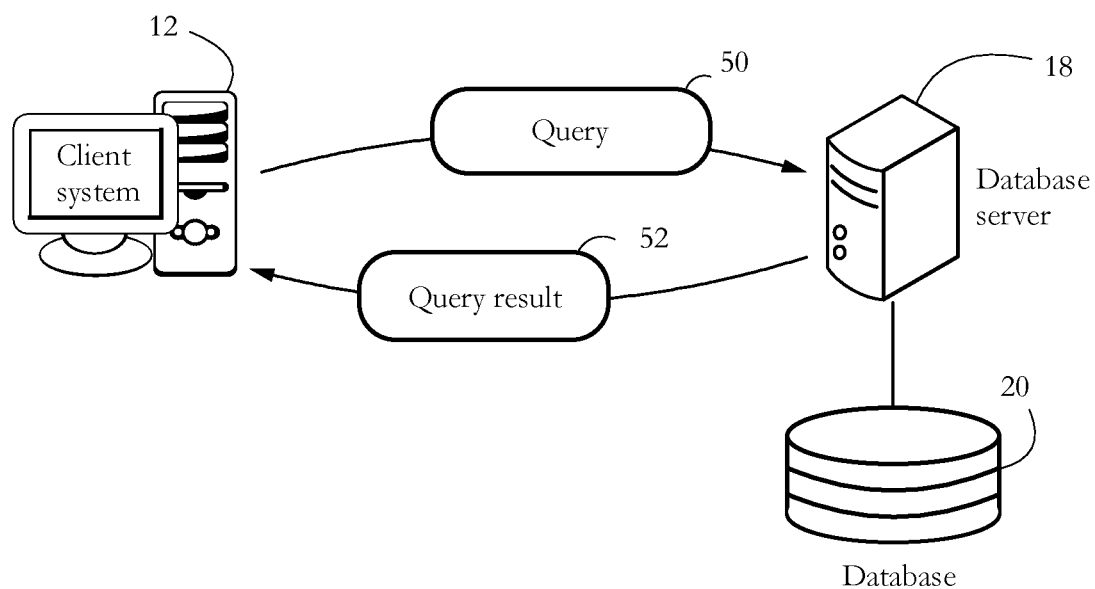
FIG. 4 shows an exemplary data exchange between a client system and the database server according to some embodiments of the present invention.

FIG. 4 shows an exemplary data exchange between client system 12 and database server 18 according to some embodiments of the present invention. Client system 12 sends a query 50 to database server 18, and in response receives a query result 52 comprising a result of executing query 50. Query 50 comprises an encoding of a set of instructions that, when executed by server 18, causes server 18 to perform certain manipulations of database 20, for instance selectively inserting or retrieving data into/from database 20, respectively. Query result 52 may comprise, for instance, an encoding of a set of database records selectively retrieved from database 20 according to query 50.

In some embodiments, query 50 is formulated in an artificial language such as SQL. In an alternative embodiment, query 50 may be formulated as a set of natural language sentences. In such embodiments, a translator module as described herein may execute on database server 18.

Figure 5:
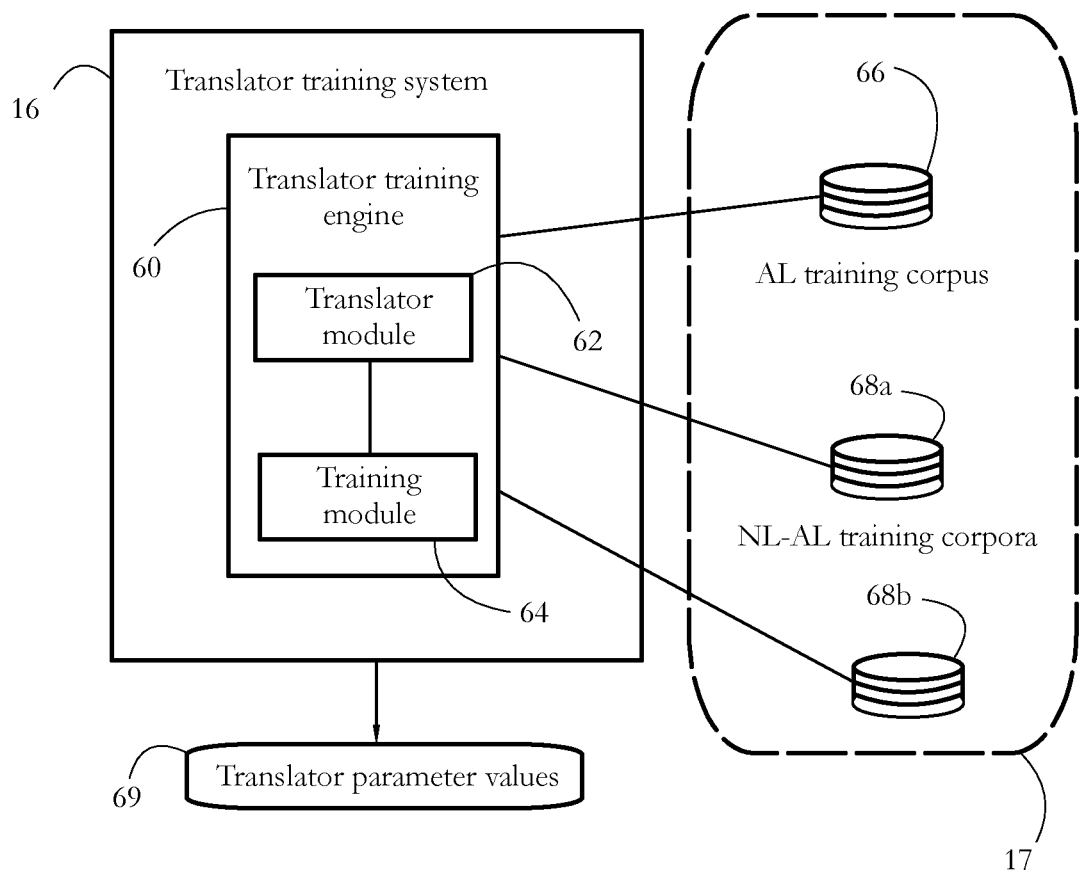
FIG. 5 illustrates exemplary components of a translator training system according to some embodiments of the present invention.

FIG. 5 illustrates exemplary components of a translator training system according to some embodiments of the present invention. Training system 16 may execute a translator training engine 60 comprising an instance of translator module 62 and a training module 64 connected to translator module 62. In some embodiments of the present invention, engine 60 is communicatively coupled to a set of training corpora 17 employed by training module 64 to train translator module 62. Corpora 17 may comprise at least one artificial language (AL) training corpus 66, and/or a set of natural-language-to-artificial-language (NL-AL) training corpora 68a-b.

In some embodiments, AL training corpus 66 comprises a plurality of entries, all formulated in the same artificial language. In one example, each entry consists of at least one AL statement, generated automatically or by a human operator. Some entries may include multiple AL statements, some of which are considered synonyms or semantic equivalents of each other. In an example wherein the respective AL is a database query language, two AL statements may be considered synonyms when they cause the retrieval of the same data from a database. Similarly, in a programming language example, two AL statements (i.e., pieces of code) may be synonyms/semantic equivalents if they produce the same computational outcome.

In some embodiments, a NL-AL corpus 68a-b comprises a plurality of entries, each entry consisting of a tuple (e.g., pair) of sentences, wherein at least one sentence is formulated in an artificial language, while another sentence is formulated in a natural language. In some embodiments, an AL side of the tuple comprises a translation of an NL side of the respective tuple into the artificial language. Stated otherwise, the respective AL side of the tuple has the same or a very similar meaning as the NL side of the respective tuple. Some NL-AL tuples may consist of one NL sentence and multiple synonymous AL sentences. Other NL-AL tuples may have multiple NL sentences corresponding to one AL sentence. Distinct NL-AL corpora 68a-b may correspond to distinct natural languages (e.g., English vs. Chinese). In another example, distinct NL-AL corpora may contain distinct sets of NL sentences formulated in the same natural language (e.g., English). In one such example, one NL-AL corpus is used to train a translator to be used by an English-speaking sales representative, while another NL-AL corpus may be used to train a translator for use by an English-speaking database administrator.

Figure 6:
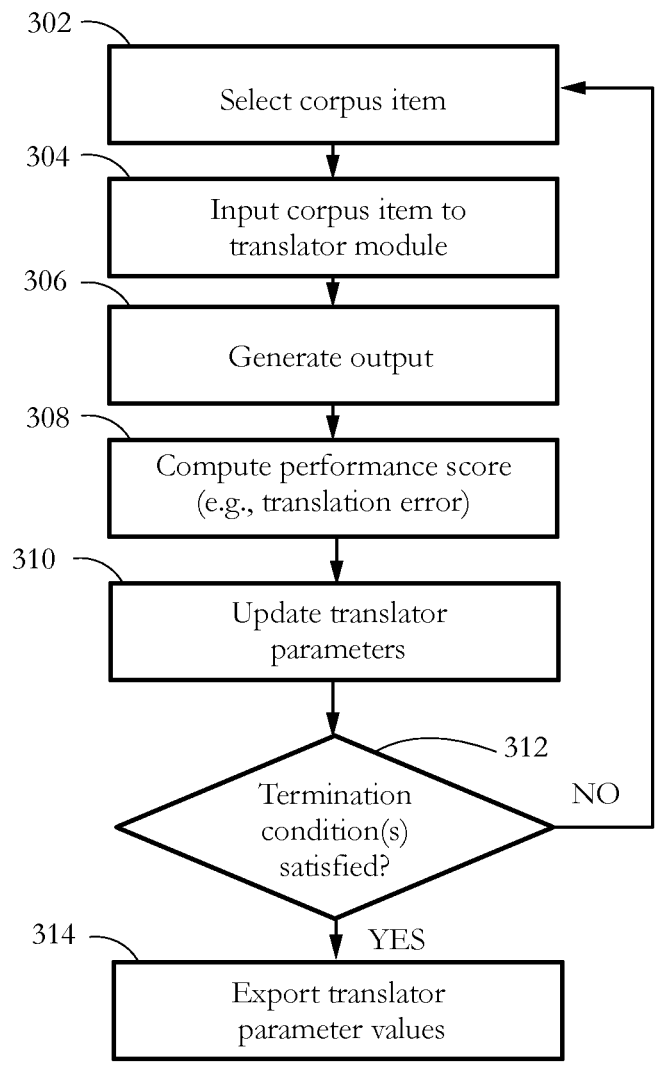
FIG. 6 shows an exemplary translator training procedure according to some embodiments of the present invention.

Training module 64 is configured to train translator module 62 to produce a desired output, for instance, to correctly translate natural language sentences into artificial language sentences, as seen in more detail below. Training herein generically denotes a process of adjusting a set of parameters of translator module 62 in an effort to obtain a desired outcome (e.g., a correct translation). An exemplary sequence of steps illustrating training is shown in FIG. 6. A sequence of steps 302-304 may select a corpus item (e.g., a natural language sentence) and input the respective corpus item to translator module 62. Module 62 may then generate an output according to the received input. A step 308 compares the respective output to a desired output and determines a performance score, for instance a translation error indicative of a degree of similarity between the actual output of module 62 and the desired output. In response to determining the performance score, in a step 310 training module 64 may update parameters of module 62 in a manner which increases the performance of translator module 62, for instance by reducing a translation error. Such parameter adjusting may proceed according to any method known in the art. Some examples include backpropagation using a gradient descent, simulated annealing, and genetic algorithms. In some embodiments, training concludes when some termination condition is satisfied (step 312). More details on termination conditions are given below.

In some embodiments, upon conclusion of training, in a step 314 translator training system 16 outputs a set of translator parameter values 69. When module 62 comprises artificial neural networks, translator parameter values 69 may include, for instance, a set of synapse weights and/or a set of network architectural parameter values (e.g., number of layers, number of neurons per layer, connectivity maps, etc.). Parameter values 69 may then be transmitted to client systems 12a-d and/or database server 18 and used to instantiate the respective local translator modules performing automated natural-to-artificial language translation.

Figure 7:
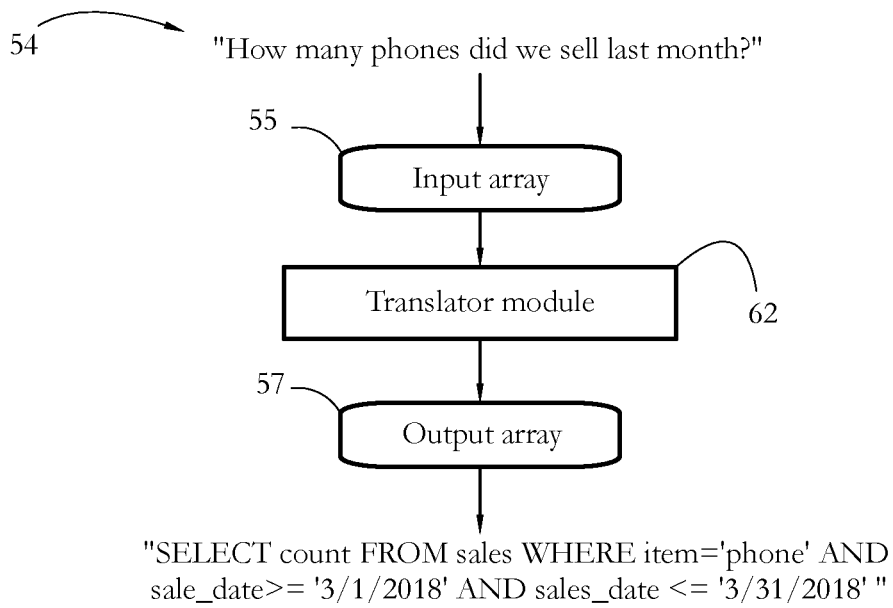
FIG. 7 illustrates an exemplary operation of a translator module according to some embodiments of the present invention.

FIG. 7 illustrates an exemplary operation of translator module 62 according to some embodiments of the present invention. Module 62 is configured to automatically translate a natural language (NL) sentence such as exemplary sentence 54 into an artificial language (AL) sentence such as exemplary sentence 56. The term 'sentence' is used herein to denote any sequence of words/tokens formulated in a natural or artificial language. Examples of natural languages include English, German, and Chinese, among others. An artificial language comprises a set of tokens (e.g., keywords, identifiers, operators) together with a set of rules for combining the respective tokens. Rules are commonly known as a grammar or a syntax, and are typically language-specific. Exemplary artificial languages include formal computer languages such as query languages (e.g., SQL), programming languages (e.g., C++, Perl, Java®, bytecode), and markup languages (e.g., XML, HTML). Exemplary NL sentences include a statement, a question, and a command, among others. Exemplary AL sentences include, for instance, a piece of computer code and an SQL query.

In some embodiments, translator module 62 receives an input array 55 comprising a computer-readable representation of an NL sentence, and produces an output array 57 comprising an encoding of the AL sentence(s) resulting from translating the input NL sentence. The input and/or output arrays may comprise an array of numerical values calculated using any method known in the art, for instance one-hot encoding. In one such example, each word of a NL vocabulary is assigned a distinct numerical label. For instance, 'how' may have the label 2 and 'many' may have the label 37. Then, a one-hot representation of the word 'how' may comprise a binary N×1 vector, wherein N is the size of the vocabulary, and wherein all elements are 0 except the second element, which has a value of 1. Meanwhile, the word 'many' may be represented as a binary N×1 vector, wherein all elements are 0 except the $37^{th}$. In some embodiments, input array 55 encoding a sequence of words such as input sentence 54 comprises a N×M binary array, wherein M denotes the count of words of the input sentence, and wherein each column of input array 55 represents a distinct word of the input sentence. Consecutive columns of input array 55 may correspond to consecutive words of the input sentence. Output array 57 may use a similar one-hot encoding strategy, although the vocabularies used for encoding input and output may differ from each other. Since input array 55 and output array 57 represent input sentence 54 and output sentence 56, respectively, output array 57 will herein be deemed a translation of input array 55.

Transforming NL sentence 54 into input array 55, as well as transforming output array 57 into AL sentence(s) 56 may comprise operations such as parsing, tokenization, etc., which may be carried out by software components separate from translator module 62.

Figure 8:
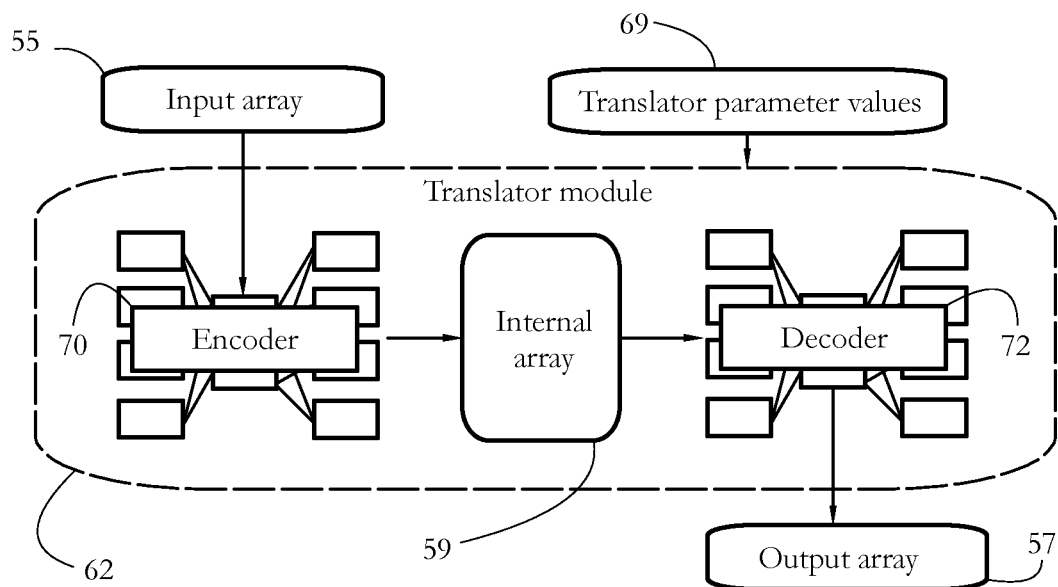
FIG. 8 illustrates exemplary components and operation of the translator module according to some embodiments of the present invention.

In some embodiments, module 62 comprises an artificial intelligence system such as an artificial neural network trained to perform the illustrated translation. Such artificial intelligence systems may be constructed using any method known in the art. In a preferred embodiment illustrated in FIG. 8, module 62 includes an encoder 70 and a decoder 72 coupled to encoder 70. Each of encoder 70 and decoder 72 may comprise a neural network, for instance a recurrent neural network (RNN). RNNs form a special class of artificial neural networks, wherein connections between the network nodes form a directed graph. Examples of recurrent neural networks include long short-term memory (LS™) networks, among others.

Encoder 70 receives input array 55 and outputs an internal array 59 comprising the translator module's own internal representation of input sentence 54. In practice, internal array 59 comprises a mathematical transformation of input array 55 via a set of operations specific to encoder 70 (e.g., matrix multiplication, application of activation functions, etc.). In some embodiments, the size of internal array 59 is fixed, while the size of input array 55 may vary according to the input sentence. For instance, long input sentences may be represented using relatively larger input arrays compared to short input sentences. From this perspective, it can be said that in some embodiments, encoder 70 transforms a variable-size input into a fixed size encoding of the respective input. In some embodiments, decoder 72 takes internal array 59 as input, and produces output array 57 by a second set of mathematical operations. The size of output array 57 may vary according to the contents of internal array 59, and therefore according to the input sentence.

Figure 9:
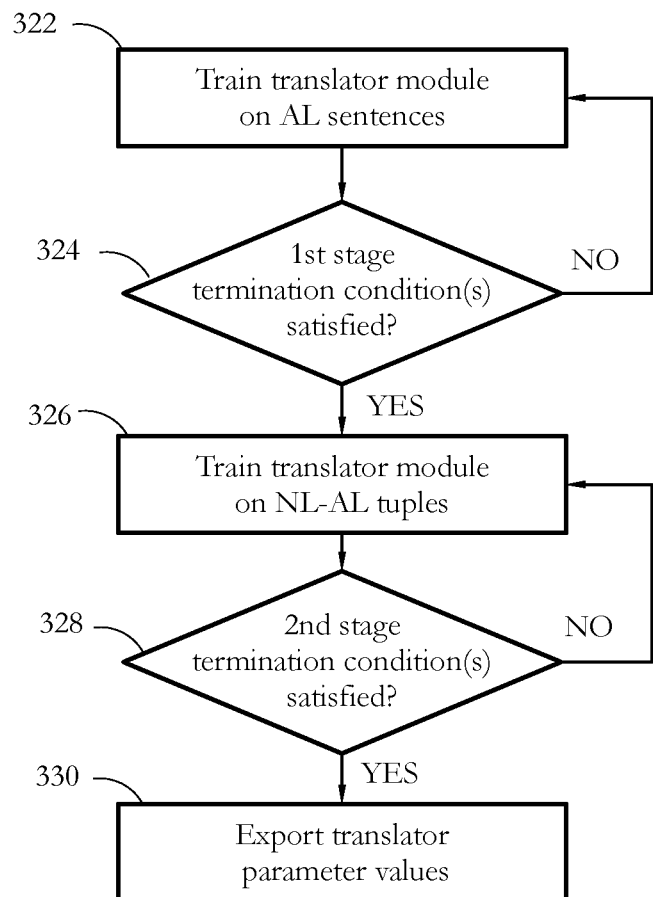
FIG. 9 shows an exemplary sequence of steps performed by the translator training system according to some embodiment of the present invention.

FIG. 9 illustrates an exemplary process of training translator module 62 to perform automated NL to AL translations. In some embodiments, training comprises at least two stages. A first stage represented by steps 322-324 comprises training an instance of translator module 62 on an artificial language corpus (e.g., AL corpus 66 in FIG. 5). In some embodiments, step 322 comprises training translator module 62 to produce an AL output when fed an AL input. In one such example, translator module 62 is trained to reproduce an input formulated in the respective artificial language. In another example, module 62 is trained, when fed an AL input, to produce a synonym/semantic equivalent of the respective input. In yet another example, module 62 is trained so that its output is at least grammatically correct, i.e., the output abides by the grammar/syntax rules of the respective artificial language.

In some embodiments, the first stage of training proceeds until a set of termination condition(s) are satisfied (step 324). Termination conditions may include performance criteria, for instance, whether an average departure from an expected output of module 62 (i.e., translation error) is smaller than a predetermined threshold. Another exemplary performance criterion comprises whether the output of translation module 62 is mostly grammatically correct, e.g., at least 90% of the time. In an embodiment wherein the output of module 62 is formulated in a programming language, testing for grammatical correctness may comprise attempting to compile the respective output, and determining that the respective output is correct when there are no compilation errors. Other exemplary termination conditions include computational cost criteria, for instance, training may proceed until a predetermined time limit or iteration count have been exceeded.

In some embodiments, a second stage of training illustrated by steps 326-328 in FIG. 9 comprises training translator module 62 on a natural-language-to-artificial-language corpus, i.e., using NL-AL tuples. In one such example, module 62 is trained, when fed an NL side of the tuple as input, to output the corresponding AL side of the tuple. In an alternative embodiment, module 62 may be trained to output at least a synonym of the AL side of the respective tuple. The second stage of training may proceed until termination criteria are satisfied (e.g., until a desired percentage of correct NL-to-AL translations is achieved). Next, in a step 330, translator training system 16 may output translator parameter values 69 resulting from training. In an exemplary embodiment wherein translator module 62 uses neural networks, parameter values 69 may include values of synapse weights obtained via training.

FIG. 10 further illustrates first-stage training in a preferred embodiment of the present invention. An illustrated first stage translator module 62a comprises an artificial language encoder 70a connected to decoder 72. AL encoder 70a takes an input array 55a and outputs an internal array 59a, which in turn is transformed by decoder 72 into an output array 57a. In some embodiments, first stage training comprises providing translator module 62a with a plurality of AL inputs, and tuning parameters of module 62a to generate AL outputs that are similar to the respective presented inputs. Stated otherwise, in some embodiments, the goal of first stage training may be to make the output more similar to the input. In alternative embodiments, the goal of training may be that the output is at least a synonym of the respective input, or that the output is grammatically correct in the respective artificial language.

In one example of $1^{st}$ stage training, for each pair of input/output arrays, training module 64 may calculate a similarity measure indicative of a degree of similarity between output and input arrays (57a and 55a in FIG. 10, respectively). The similarity measure may be computed using any method known in the art, for instance according to a Manhattan or Levenshtein distance between the input and output arrays. Training module 64 may then adjust parameters of AL encoder 70a and/or decoder 72 to increase the similarity between outputs of decoder 72 and inputs of AL encoder 70a, e.g., to reduce the average Manhattan distance between arrays 55a and 57a.

First stage training may continue until first stage termination condition(s) are met (e.g., until a predetermined performance level is attained, until all members of AL corpus 66 have been used in training, etc.).

Figure 11:
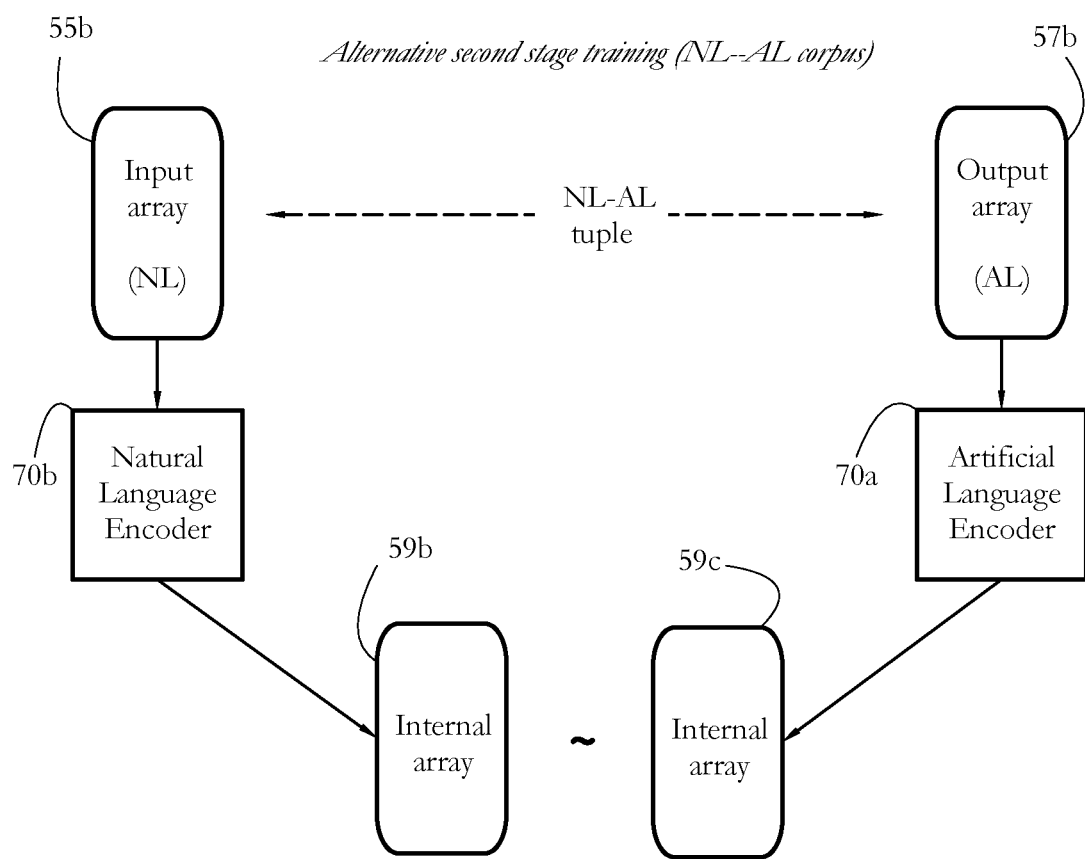
FIG. 11-A illustrates an exemplary second stage of training the translator module according to some embodiments of the present invention.

FIG. 11-A illustrates an exemplary second-stage training process, which comprises training to translate between a natural language and the artificial language used in $1^{st}$ stage training. In some embodiments, progressing from first to second stage comprises switching to a second stage translator module 62b obtained by replacing AL encoder 70a with a natural language encoder 70b, while preserving the already trained decoder 72. Stated otherwise, decoder 72 remains instantiated with the parameter values resulting from first-stage training. The architecture and/or parameter values of NL encoder 70b may differ substantially from that of AL encoder 70a. One reason for such difference is that the vocabularies of artificial and natural languages typically differ from each other, so that input arrays representing NL sentences may differ at least in size from input arrays representing AL sentences. Another reason why encoders 70a-b may have distinct architectures is that the grammar/syntax of artificial languages typically differs substantially from that of natural languages.

NL encoder 70b takes an input array 55b representing a NL sentence and outputs an internal array 59b. In some embodiments, internal array 59b has the same size and/or structure as internal array 59a output by AL encoder 59a of translation module 62a (see FIG. 10). Internal array 59b is then fed as input to decoder 72, which in turn produces an output array 57c representing an AL sentence.

In some embodiments, second-stage training uses NL-AL tuples, wherein an AL side of the tuple represents a translation into the target AL of the NL side of the respective tuple. Second-stage training may comprise providing NL encoder 70b with a plurality of NL inputs, wherein each NL input comprises an NL side of a NL-AL tuple, and tuning parameters of translator module 62b so that the output of decoder 72 is similar to an AL-side of the respective tuple NL-AL tuple. Stated otherwise, the aim of $2^{nd}$ state training is to make the outputs of decoder 72 more similar to the translations into the target AL of the respective NL inputs.

In one exemplary embodiment, in response to feeding the NL-side of each tuple (represented as array 55b in FIG. 11-A) to NL encoder 70b, training module 64 may compare an output of decoder 72 (array 57c) to the AL-side of the respective tuple (array 57b). The comparison may include calculating a similarity measure indicative of a degree of similarity between arrays 57b and 57c. Training module 64 may then adjust parameters of NL encoder 70b and/or decoder 72 in the direction of increasing the similarity between arrays 57b and 57c.

An alternative scenario for 2nd stage training is illustrated in FIG. 11-B. This alternative scenario employs both the (trained) AL encoder obtained via first-stage training (e.g., AL encoder 70a in FIG. 10 instantiated with parameter values resulting from Pt stage training) and NL encoder 70b. In some embodiments, NL encoder 70b is fed input array 55b representing the NL-side of an NL-AL tuple, while AL encoder is fed an output array 57b representing the AL-side of the respective tuple. The method relies on the observation that AL encoder 70a is already configured during Pt stage training to transform an AL input into a 'proper' internal array 59c that decoder 72 can then transform back into the respective AL input. Stated otherwise, for decoder 72 to produce output array 57a, its input must be as close as possible to the output of (already trained) AL encoder 70a. Therefore, in the embodiment illustrated in FIG. 11-B, training module 64 may compare the output of NL encoder 72 (i.e., an internal array 59b) to internal array 59c, and quantify the difference as a similarity measure. Training module 64 may then adjust parameters of NL encoder 70b and/or decoder 72 in the direction of increasing the similarity between arrays 59b and 59c.

Figure 12:
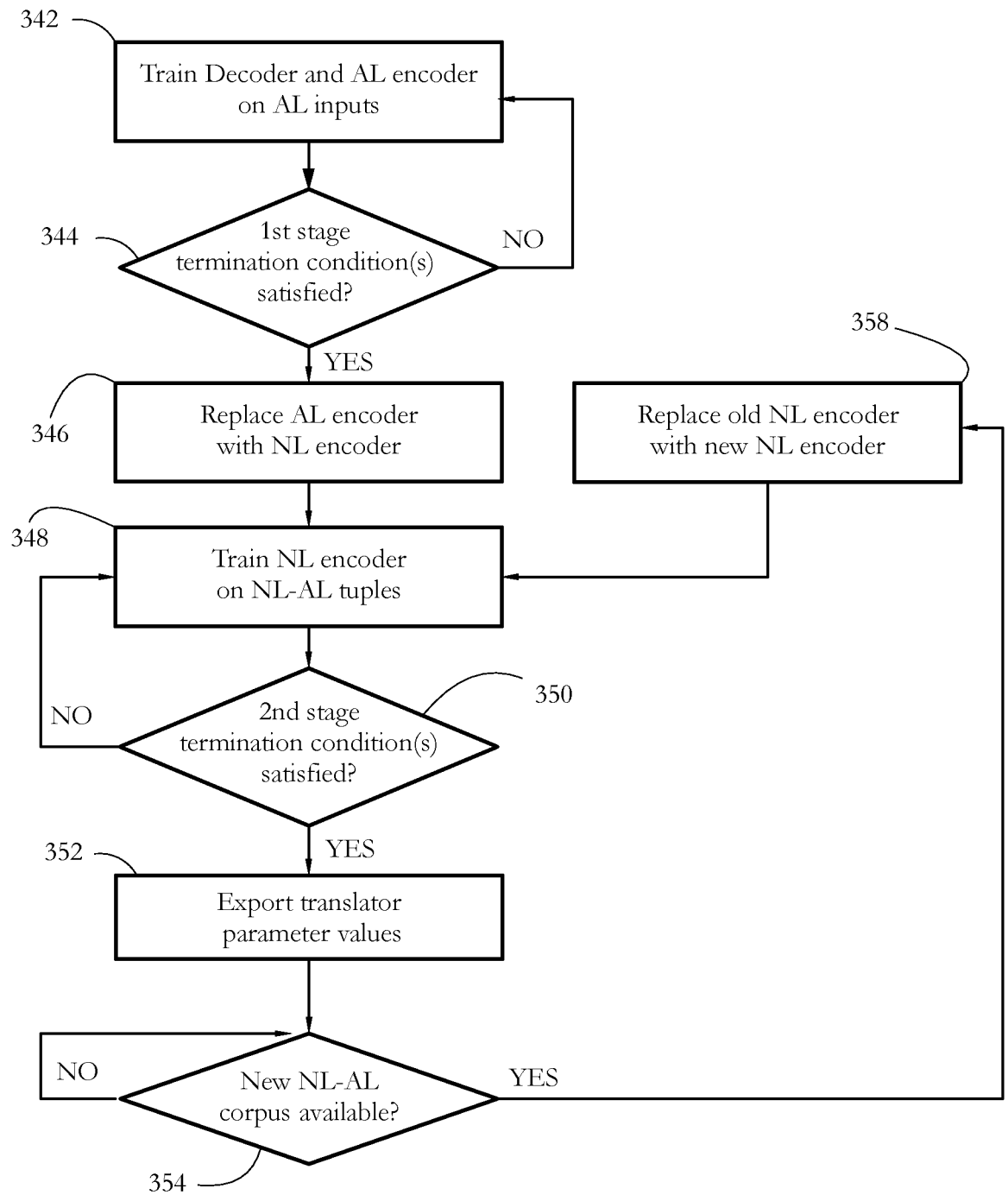
FIG. 12 shows an exemplary sequence of steps for training a translator module on multiple training corpora, according to some embodiments of the present invention.

FIG. 12 shows an exemplary sequence of steps for training translator module 62 on multiple training corpora according to some embodiments of the present invention. The illustrated method relies on the observation that decoder 72 may be trained only once for each target artificial language (see Pt stage training above), and then re-used in already trained form to derive multiple translator modules, for instance, modules that may translate from multiple source natural languages (e.g., English, German, etc.) to the respective target artificial language (e.g., SQL).

In another example, each distinct translator module may be trained on a distinct set of NL sentences formulated in the same natural language (e.g., English). This particular embodiment relies on the observation that language is typically specialized and task-specific, i.e, sentences/commands that human operators use to solve certain problems differ from sentences/commands used in other circumstances. Therefore, some embodiments employ one corpus (i.e., set of NL sentences) to train a translator to be used by a salesperson, and another corpus to train a translator to be used by technical staff.

Steps 342-344 in FIG. 12 illustrate a $1^{st}$ stage training process, comprising training an AL encoder 70a and/or decoder 72. In response to a successful $1^{st}$ stage training, a step 346 replaces AL encoder 70a with an NL encoder. In some embodiments, a $2^{nd}$ stage training of the NL encoder is then carried out for each available NL-AL corpus. When switching from one NL-AL corpus to another (e.g., switching from English to Spanish, or from 'sales English' to 'technical English'), some embodiments replace the existing NL encoder with a new NL encoder suitable for the current NL-AL corpus (step 358), while preserving the already trained decoder 72. Such optimizations may substantially facilitate and accelerate training of automatic translators.

In some embodiments, $2^{nd}$ stage training only adjusts parameters of NL encoder 70b (see FIGS. 11-A-B), while keeping the parameters of decoder 72 fixed at the value(s) obtained via Pt stage training. Such a training strategy aims to preserve the performance of decoder 72 at the level achieved through Pt stage training, irrespective of the choice of source natural language or NL-AL corpus. In other embodiments wherein training comprises adjusting parameters of both NL encoder 70b and decoder 72, step 358 may further comprise resetting parameters of decoder 72 to values obtained at the conclusion of $1^{st}$ stage training.

The exemplary systems and methods described above allow an automatic translation from a source natural language such as English into a target artificial language (e.g., SQL, a programming language, a markup language, etc.). One exemplary application of some embodiments of the present invention allows a layman to perform database queries using plain questions formulated in a natural language, without requiring knowledge of a query language such as SQL. For instance, a sales operator may ask a client machine "how many customers under 30 do we have in Colorado?". In response, the machine may translate the respective question into a database query and execute the respective query to retrieve an answer to the operator's question.

Some embodiments use a translator module to translate a NL sequence of words into an AL sentence, for instance into a valid query usable to selectively retrieve data from a database. The translator module may comprise a set of artificial neural networks, such as an encoder network and a decoder network. The encoder and decoder may be constructed using recurrent neural networks (RNN) or any other artificial intelligence technology.

In some embodiments, training the translator module comprises at least two stages. In a first stage, the translator module is trained to produce AL output in response to an AL input. For instance, $1^{st}$ stage training may comprise training the translator module to reproduce an AL input. In an alternative embodiment, the translator is trained to produce grammatically correct AL sentences in response to an AL input. Using a convenient metaphor, it may be said that $1^{st}$ stage training teaches the translator module to 'speak' the respective artificial language. In practice, $1^{st}$ stage training comprises presenting the translator with a vast corpus of AL sentences (e.g., SQL queries). For each input sentence, the output of the translator is evaluated to determine a performance score, and parameters of the translator are adjusted to improve the performance of the translator in training.

A subsequent $2^{nd}$ stage comprises training the translator module to produce AL output in response to an NL input formulated in the source language. The second stage of training may employ a NL-AL corpus comprising a plurality of sentence tuples (e.g., pairs), each tuple having at least a NL side and an AL side. In an exemplary embodiment, each AL-side of a tuple may represent a translation of the respective NL-side, i.e., a desired output of the translator when presented with the respective NL-side of the tuple. An exemplary $2^{nd}$ stage training proceeds as follows: for each NL-AL tuple, the translator receives the NL-side as input. The output of the translator is compared to the AL-side of the tuple to determine a translation error, and parameters of the translator are adjusted to reduce the translator error.

Conventional automatic translators are typically trained using pairs of items, wherein one member of the pair is formulated in a source language, while the other member of the pair is formulated in the target language. One technical hurdle facing such conventional training is the size of the training corpus. It is well accepted in the art that larger, more diverse corpora produce more robust and performant translators. Achieving a reasonable translation performance may require tens of thousands of NL-AL tuples or more. But since NL-AL tuples cannot in general be produced automatically, the amount of skilled human work required for setting up such large corpora is impractical.

In contrast, AL sentences may be produced automatically in great numbers. Some embodiments of the present invention employ this insight to increase the performance, facilitate the training, and shorten the time-to-market of the translator module. A first stage of training may be carried out on a relatively large, automatically generated AL corpus, resulting in a partially trained translator capable of reliably producing grammatically correct AL sentences in the target artificial language. A second stage of training may then be carried out on a more modest-sized NL-AL corpus.

Another advantage of a two-stage training as described herein is that multiple NL-AL translators may be developed independently of each other, without having to repeat the 1st stage training. The decoder part of the translator module may thus be re-used as is (i.e., without re-training) in multiple translators, which may substantially reduce their development costs and time-to-market. Each such distinct translator may correspond, for instance, to a distinct source natural language such as English, German, and Chinese. In another example, each distinct translator may be trained on a different set of sentences of the same natural language (e.g., English). Such situations may arise when each translator is employed for a distinct task/application, for instance one translator is used in sales, while another is used in database management.

Although the bulk of the present description was directed to training for automatic translation from a natural language into a query language such as SQL, a skilled artisan will appreciate that the described systems and methods may be adapted to other applications and artificial languages. Alternative query languages include SPARQL and other resource description format (RDF) query languages. Exemplary applications of such translations include facilitating access to data represented in RDF, for instance for extracting information from the World Wide Web and/or heterogeneous knowledgebases such as Wikipedia®. Another exemplary application of some embodiments of the present invention is automatically generating RDF code, for instance to automatically organize/structure heterogeneous data, or to introduce data into a knowledgebase without having specialized knowledge of programming or query languages.

Applications of some embodiments wherein the target language is a programming language may include, among others, automatically producing code (e.g., shell script) enabling human-machine interaction. For instance, a user may ask a machine to perform an action (e.g., call a telephone number, access a webpage, fetch an object, etc.). An automatic translator may translate the respective NL command into a set of computer-readable instructions that may be executed in response to receiving the user's command. Other exemplary applications include automatically translating code between two distinct programming languages (e.g., Python to Java®), and automatically processing rich media (e.g., annotating images and video).

In yet another example, some computer security providers specializing in detecting malicious software use a dedicated programming language (a version of bytecode) to encode malware detection routines and/or malware-indicative signatures. Some embodiments of the present invention may facilitate such anti-malware research and development by allowing an operator without specialized knowledge of bytecode to automatically generate bytecode routines.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of the computer system to train an automatic translator to translate from a natural language (NL) to an artificial language (AL), wherein training the automatic translator comprises:
performing a first stage of training;
in response to performing the first stage of training, determining whether a first stage training termination condition is satisfied; and
in response, when the first stage training termination condition is satisfied, performing a second stage of training;
wherein performing the first stage of training comprises:
coupling an AL encoder neural network (NN) to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input, and
training the decoder NN to improve a similarity between the AL input and the AL output;
and wherein performing the second stage of training comprises:
coupling a trained decoder NN generated by the first stage of training to a NL encoder NN, the NL encoder NN configured to receive an NL input formulated in the natural language and to transmit a result of processing the NL input to the trained decoder NN,
employing the trained decoder NN to determine another AL output according to the result of processing the NL input, and
training the NL encoder NN to improve a similarity between the other AL output and a target AL output comprising a translation of the NL input into the artificial language.

2. The method of claim 1, wherein the artificial language comprises an item selected from a group consisting of a database query language, a programming language, and a markup language.

3. The method of claim 1, wherein performing the second stage of training further comprises:
employing a trained AL encoder NN resulted from the first stage of training to receive the target AL output and in response, to output a result of processing the target AL output; and
wherein training the NL encoder NN comprises adjusting a set of parameters of the NL encoder NN according to a similarity between the result of processing the NL input and the result of processing the target AL output.

4. The method of claim 1, further comprising, in response to performing the second stage of training, employing at least one hardware processor of the computer system to:
couple the trained decoder NN resulted from the first stage of training to another NL encoder NN, the other NL encoder NN configured to receive another NL input and to transmit a result of processing the other NL input to the trained decoder NN, wherein the other NL input is formulated in another natural language distinct from the natural language;
employing the trained decoder NN to determine a third AL output according to the result of processing the other NL input, and
training the other NL encoder NN to improve a similarity between the third AL output and a translation of the other NL input into the artificial language.

5. The method of claim 1, wherein the NL encoder comprises a recurrent neural network.

6. The method of claim 1, wherein the AL decoder comprises a recurrent neural network.

7. The method of claim 1, wherein determining whether a first stage training termination condition is satisfied comprises determining whether the AL output is grammatically correct.

8. The method of claim 1, wherein training the decoder NN comprises determining a degree of similarity between the AL output and a synonym of the AL input.

9. A computer system comprising at least one hardware processor configured to train an automatic translator to translate from a natural language (NL) to an artificial language (AL), wherein training the automatic translator comprises:
perform a first stage of training;
in response to performing the first stage of training, determine whether a first stage training termination condition is satisfied; and
in response, when the first stage training termination condition is satisfied, perform a second stage of training;
wherein performing the first stage of training comprises:
coupling an AL encoder neural network (NN) to a decoder NN, wherein the AL encoder NN is configured to receive an AL input formulated in the artificial language and transmit a result of processing the AL input to the decoder NN, and wherein the decoder NN is configured to produce an AL output according to the result of processing the AL input, and
training the decoder NN to improve a similarity between the AL input and the AL output;
and wherein performing the second stage of training comprises:
coupling a trained decoder NN generated by the first stage of training to a NL encoder NN, the NL encoder NN configured to receive an NL input formulated in the natural language and to transmit a result of processing the NL input to the trained decoder NN,
employing the trained decoder NN to determine another AL output according to the result of processing the NL input, and
training the NL encoder NN to improve a similarity between the other AL output and a target AL output comprising a translation of the NL input into the artificial language.

10. The computer system of claim 9, wherein the artificial language comprises an item selected from a group consisting of a database query language, a programming language, and a markup language.

11. The computer system of claim 9, wherein performing the second stage of training further comprises:
employing a trained AL encoder NN resulted from the first stage of training to receive the target AL output and in response, to output a result of processing the target AL output; and
wherein training the NL encoder NN comprises adjusting a set of parameters of the NL encoding NN according to a similarity between the result of processing the NL input and the result of processing the target AL output.

12. The computer system of claim 9, further configured, in response to performing the second stage of training, to:
couple the trained decoder NN resulted from the first stage of training to another NL encoder NN, the other NL encoder NN configured to receive another NL input and to transmit a result of processing the other NL input to the trained decoder NN, wherein the other NL input is formulated in another natural language distinct from the natural language;
employ the trained decoder NN to determine a third AL output according to the result of processing the other NL input, and
train the other NL encoder NN to improve a similarity between the third AL output and a translation of the other NL input into the artificial language.

13. The computer system of claim 9, wherein the NL encoder comprises a recurrent neural network.

14. The computer system of claim 9, wherein the AL decoder comprises a recurrent neural network.

15. The computer system of claim 9, wherein determining whether a first stage training termination condition is satisfied comprises determining whether the AL output is grammatically correct.

16. The computer system of claim 9, wherein training the decoder NN comprises determining a degree of similarity between the AL output and a synonym of the AL input.

17. A non-transitory computer-readable medium storing instructions which, when executed by a first hardware processor of a first computer system, cause the first computer system to form a trained automatic translator configured to translate from a natural language (NL) to an artificial language (AL), the automatic translator comprising a NL encoder neural network (NN) and a decoder NN connected to the NL encoder NN, wherein training the automatic translator comprises employing a second hardware processor of a second computer system to:
perform a first stage of training;
in response to performing the first stage of training, determine whether a first stage training termination condition is satisfied; and
in response, when the first stage training termination condition is satisfied, perform a second stage of training;
wherein performing the first stage of training comprises:
coupling an artificial language (AL) encoder NN to the decoder NN, wherein the AL encoder NN is configured to receive an AL input formulated in an artificial language and transmit a result of processing the AL input to the decoder NN, and wherein the decoder NN is configured to produce an AL output according to the result of processing the AL input, and
training the decoder NN to improve a similarity between the AL input and the AL output;
and wherein performing the second stage of training comprises:
coupling a trained decoder NN generated by the first stage of training to the NL encoder NN, the NL encoder NN configured to receive an NL input formulated in the natural language and to transmit a result of processing the NL input to the trained decoder NN,
employing the trained decoder NN to determine another AL output according to the result of processing the NL input, and
training the NL encoder NN to improve a similarity between the other AL output and a target AL output comprising a translation of the NL input into the artificial language.

18. A computer system comprising a first hardware processor configured to execute a trained automatic translator configured to translate from a natural language (NL) to an artificial language (AL), the automatic translator comprising a NL encoder neural network (NN) and a decoder NN connected to the NL encoder NN, wherein training the automatic translator comprises employing a second hardware processor of a second computer system to:
perform a first stage of training;
in response to performing the first stage of training, determine whether a first stage training termination condition is satisfied; and
in response, when the first stage training termination condition is satisfied, perform a second stage of training;
wherein performing the first stage of training comprises:
coupling an artificial language (AL) encoder NN to the decoder NN, wherein the AL encoder NN is configured to receive an AL input formulated in an artificial language and transmit a result of processing the AL input to the decoder NN, and wherein the decoder NN is configured to produce an AL output according to the result of processing the AL input, and
training the decoder NN to improve a similarity between the AL input and the AL output;
and wherein performing the second stage of training comprises:
coupling a trained decoder NN generated by the first stage of training to the NL encoder NN, the NL encoder NN configured to receive an NL input formulated in the natural language and to transmit a result of processing the NL input to the trained decoder NN,
employing the trained decoder NN to determine another AL output according to the result of processing the NL input, and
training the NL encoder NN to improve a similarity between the other AL output and a target AL output comprising a translation of the NL input into the artificial language.

\* \* \* \* \*